Figure 1:
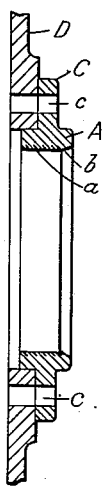

G. E. BRADSHAW.
ROLLER BEARING.
APPLICATION FILED APR. 11, 1918.

1,324,638.

Patented Dec. 9, 1919.
2 SHEETS—SHEET 1.

Inventor
Granville Eastwood Bradshaw
by Frank Laukkerman
Atty.

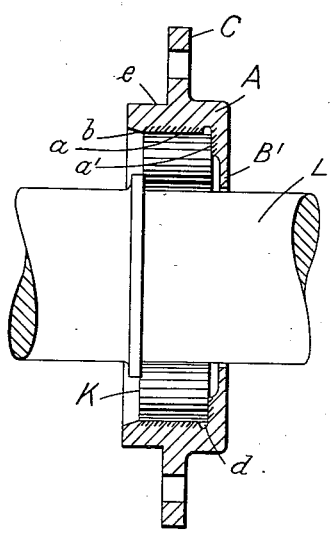
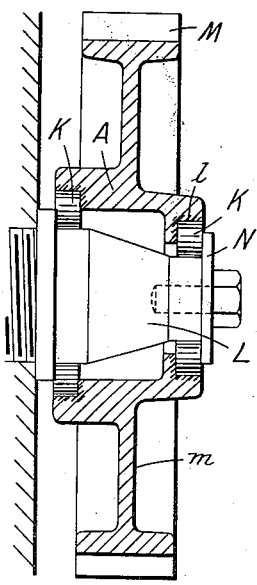
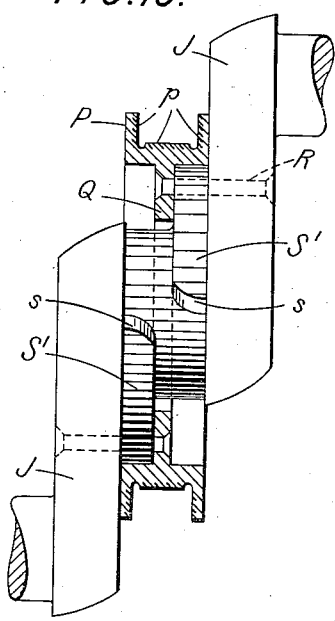
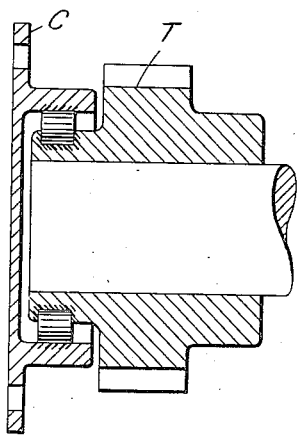

UNITED STATES PATENT OFFICE.

GRANVILLE EASTWOOD BRADSHAW, OF WALTON-ON-THAMES, ENGLAND.

ROLLER-BEARING.

1,324,638. Specification of Letters Patent. Patented Dec. 9, 1919.

Application filed April 11, 1918. Serial No. 228,005.

*To all whom it may concern:*

Be it known that I, GRANVILLE EASTWOOD BRADSHAW, a subject of the King of Great Britain and Ireland, of A. B. C. Motor Works, Hersham, Walton-on-Thames, in the county of Surrey, England, have invented new and useful Improvements in Roller-Bearings, of which the following is a specification.

My invention relates to improvements in roller and ball races for use on machinery in general, and especially internal combustion engines and the like.

The principal object of this invention is to obtain a roller or ball race which is light and strong, adaptable to various parts of an engine (particularly the crankshaft of an internal combustion engine), and on account of its great reduction in weight, is particularly suitable for the bearings of aircraft engines.

My invention consists primarily in an improvement in the races of bearings of the roller or ball type, whereby these races can be manufactured so that they have increased stiffness where desired, and are made either hard or soft on particular parts, in order to meet the conditions required in such parts in the machinery to which they are applied.

Made according to my invention, the race is hardened by any suitable process on the track of the rollers or balls and it may be fitted with a rib or flange or other device, for the purpose of attaching it adequately to any member. This rib or flange or other part which is integral with it, may be left soft in known manner, such as by electroplating before carbonizing, or by leaving an excess of metal initially and machining it off before plunging when hardening, or any known practice may be utilized. This rib or flange or integral part may be drilled or otherwise adapted to be bolted or attached rigidly to any suitable mount, or it may be formed integral with a gear wheel of any known design, or it may form the shank of a connecting rod in which the big end constitutes the outer race of the roller or ball bearing, which outer race may be integral with the connecting rod, and which may be hardened either in the big end alone, or in any part desired, and may be left soft in the shank of the rod so as to enable it better to withstand shocks and vibrations without fracture, as would often occur if the whole of the rod were hardened. This fracture would be due to a hardened part being more brittle than an unhardened part.

Another advantage of my invention is as follows. In ordinary roller bearings, any overload that may occur often tends to chip the corners of the rollers, particularly if there is any increased pressure on the corners due to an inaccuracy of the races; but in my invention, I place the web approximately in line with the center of the roller. This I have found has decreased the pressure on the corners of the rollers, due to the outer race being less rigid where it is in contact with the corners, thus allowing a very slight spring to take place. The amount of this spring is almost infinitesimally small, and yet I have found it sufficient to prevent the roller from chipping.

Figure 5:
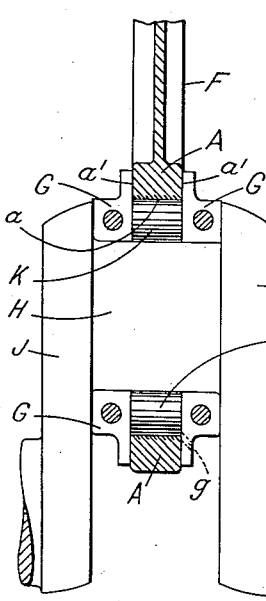
Figure 6:
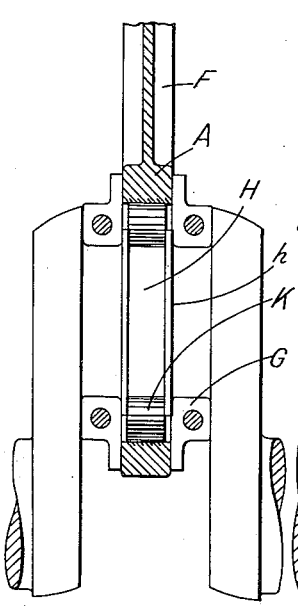
Figure 7:
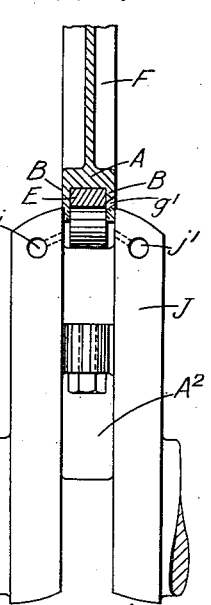

Reference will hereinafter be made to the accompanying drawings showing typical examples of my said invention in certain forms, Figures 1 to 4 being views in cross section of the outer races of certain somewhat similar bearings;

Figs. 5, 6 and 7 views of a connecting rod big end in position upon a crank pin;

Fig. 8 showing a modified form of outer race in conjunction with a shaft;

Fig. 9 a gear wheel integral with the outer race combined with an overhung shaft;

Fig. 10 an example of my invention applied to an inner race, and

Fig. 11 a variation for use with a gear shaft, both fully described hereinafter.

The same letters of reference denote the same or similar parts in the respective figures.

In Fig. 1, A is an outer race or cage of a roller bearing, hardened only on the part *a*, this being the track of the rollers. One edge *b* is chamfered in order to enable the race A to slide easily into position upon the rollers. The flange C is left soft, or is hardened on any part where hardness may be necessary, and it is provided with holes *c*, through which bolts, rivets or screws are passed by which its spigot *e* is secured in the crank case D or any other suitable part.

Figure 2:
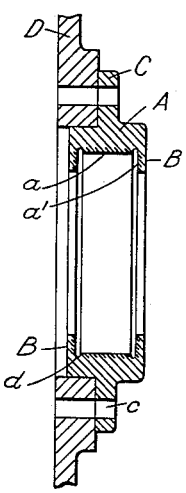

In Fig. 2, is shown a similar race, with a lip B on each side (or on one side only, if desired) separated from the track *a* by a small recess $d$, which facilitates the work of machining and grinding the face $a$. The lips B are hardened as at $a'$, upon their inner surfaces. The flange C may be drilled with holes $c$ and inserted into a part D, as in Fig. 1.

Figure 3:
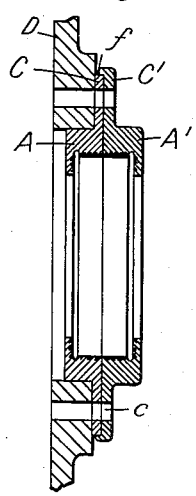

Fig. 3 shows a similar outer race to Fig. 2, but in this case, it is in two pieces or halves A A' divided down the center of their flanges C C' for the purpose of assembling, and in order to maintain alinement of the two halves of this race the edge of the smaller flange C fitting into the other flange C', as at $f$ which is rabbeted to form a seating for it.

Figure 4:
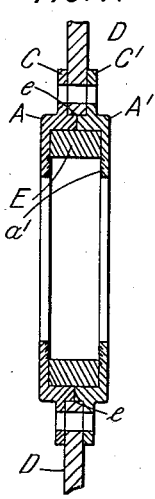

Fig. 4 illustrates a further modification of this outer race, and may have a completely hardened ring E and forming the inner race, and one or two flanges C which may be hardened in any desired place, in the manner above referred to. This race is adapted to be fastened on to a flange or web D with holes in it for rivets or other clamping means, and each half A A', (or one of them) may be formed with a seat $e$ at the base of the flanges C C'.

Instead of the flanges C or C' in Figs. 1, 2, 3 and 4, any alternative means may be adopted for rigidly carrying this outer race in the crank casing or other part that is desired. But when these outer races have to be carried direct in aluminium, which is a soft metal, the flanges and bolt holes mentioned are preferable, and it is further preferable to have flanges and spigots soft on the surfaces that are in contact with the aluminium, as I have found that this gives a better hold on to the aluminium and prevents the aluminium being so hammered as to make the outer race a loose fit, which frequently occurs when the outer race is hardened on the outside and pushed into the soft aluminium, as is usual.

Fig. 5 shows this invention applied to a connecting rod big end bearing. F is the shank of the rod which may be of H section as shown, or any other known section, and may be kept soft as already described. A is the big end outer race which is integral with the connecting rod, and may be hardened on the faces $a\ a'$. G G are split collars of the kind described in my previous Patent No. 24190/14, issued in Great Britain and this, if desired, may be hardened only on the face in contact with some working part. H is the crank pin which may be hardened only on the required place in the manner above described, and J is the crank web. K K are rollers. The split collars G may be drilled with holes such as $g$ for the purpose of lubrication.

Fig. 6 indicates a similar connecting rod big end bearing, but the crank pin H is fitted with ribs $h$ which are integral with the crank pin, and may be hardened on the sides in contact with the rollers K and left soft on the sides in contact with the split collars G. In this case, the connecting rod big end A, which is also integral with the connecting rod F, may be wider than the roller K. This arrangement prevents the roller from coming into contact with the split collars G and avoids risk of them catching up or jamming against the split in such collar.

Fig. 7 shows a further adaptation of my invention to a connecting rod big end, and in this case the connecting rod is split diametrically, whereby only one half of the big end bearing A is integral with the shank F of the connecting rod, the other half $A^2$ being in the form of a cap. The outer track of the rollers, however, is a one piece ring E, and may be completely hardened, while the flanges B on the big end may be hardened in any desired parts as already described. In this figure, the half of the bearing which is integral with the connecting rod is shown in section, and the cap $A^2$ is shown in full. $g'$ is an oil hole communicating to the rollers K, and any suitable number of these holes may be drilled, or alternatively holes may be drilled in the crank web J and a suitable hole $j$ with a cup $j'$ may be drilled leading from $j'$ to the rollers, so that as the crank rotates, oil is flung into the cup $j'$, travels up the passage $j$ and finds its way out of the bearing through the sides of the connecting rod end A, which has, of course, sufficient clearance to be a smooth running fit.

Fig. 8 illustrates an outer race A similar to Fig. 1, but having one flange B' extending inward so as to leave a very small clearance between the flange and the shaft L, this flange being for the purpose of retaining the oil. The flange is integral with the outer race, but may not be hardened except on the face $a'$, which part, together with the roller track $a$ is alone in contact with the rollers K. The connecting flange C on the outside is situated about the center of the rollers for the purpose of concentrating the load more on the center of each roller than on the ends, in order to prevent the rollers from chipping on their corners. This outer race A may be spigoted in the aluminium or other metal portion either by the spigot $e$ or at any other suitable part. $d$ is a recess and $b$ a chamfered edge, as in Figs. 1 and 2. The connecting or carrying flange C in Figs. 1, 2, 3, 4 and 8 may be either circular or square or any other desired shape, or may be formed into small lugs or bosses where extreme lightness is desired, but it is generally preferable to maintain the section of the races constant in order to prevent uneven springing or give in these races when the bearing is under heavy load, which spring or give would cause the track of the outer race to become distorted from its true circular shape.

Another method of applying this bearing is shown in Fig. 9 wherein the outer race A is integral with a gear wheel M in which the teeth may be left soft or hardened as desired, and one or more ball or roller races may be used to carry this wheel. The outer race forms the boss A, having one or more bearings $k$ and $l$. These bearings may be of different diameter, if desired, such as in the case of overhung shafting, and a hardened washer N may be screwed or otherwise attached to one end of the shaft L for the purpose of holding the rollers K in position. The web $m$ may be left soft, as hereinbefore described.

I do not confine my invention to outer races alone, but may apply it to the inner race also, and Fig. 10 shows an application of this as an example. P is the inner race which may be hardened on the surfaces $p$, and integral with this race is carried the flange Q, which may be left soft as previously described, and drilled for rivets R, or screws or bolts may be fitted. The example shown in Fig. 10 is an application to the main bearings of a crankshaft, and this permits the inner race P to be threaded over the crank throws J, and bolted or riveted rigidly in position. To facilitate this, the shoulders S are turned on their outside concentric to the center line of the crankshaft, and are chamfered away on the corners $s$ in order to enable the races P to be threaded into position.

The flange C is shown in the center of the track of the rollers in Figs. 1, 2 and 8, such position reducing the liability of the rollers to become chipped on their corners as previously described. Nevertheless, I do not bind myself to the fitting of this flange in any particular position. Thus, the races may be used as shown in Fig. 11 with the flange C at one end of the race. This type of race is sometimes useful when it has to carry a gear wheel or shaft T or other heavily stressed part, as the flange C can be light in section and allow a small amount of spring under heavy shocks.

Any of the outer races shown in Figs. 1, 2, 3, 4, 8 and 9 can be reversed and adapted for inner races, and it should be noted that these adaptations of this invention are only as illustrations, and that the races may be built up in numerous different shapes. If the races are fitted with balls instead of rollers, the tracks should be curved accordingly.

I claim:—

1. In an anti-friction bearing, a bearing ring having a hardened race way and an unhardened flange for attachment to a supporting part.

2. In an anti-friction bearing, a bearing ring having a race way and a flange, the bearing surfaces of the ring and flange being hardened and an unhardened flange for attaching the race way to a support.

GRANVILLE EASTWOOD BRADSHAW.

Witnesses:
T. A. DENNIL,
G. L. BRIDGES.